T. S. HUNTER.
Harvester.
No. 41,071.
2 Sheets—Sheet 1.
Patented Jan. 5, 1864.
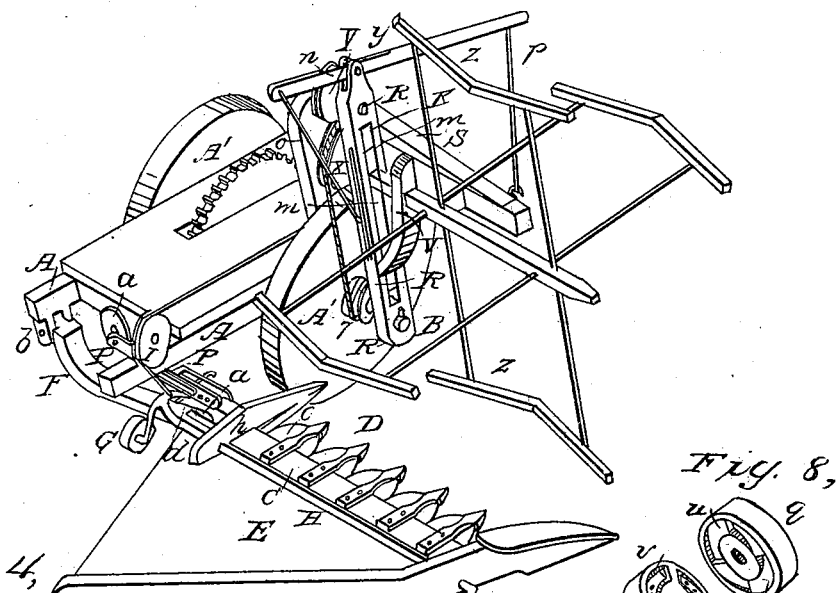

T. S. HUNTER.
Harvester.
No. 41,071.
2 Sheets—Sheet 2.
Patented Jan. 5, 1864.
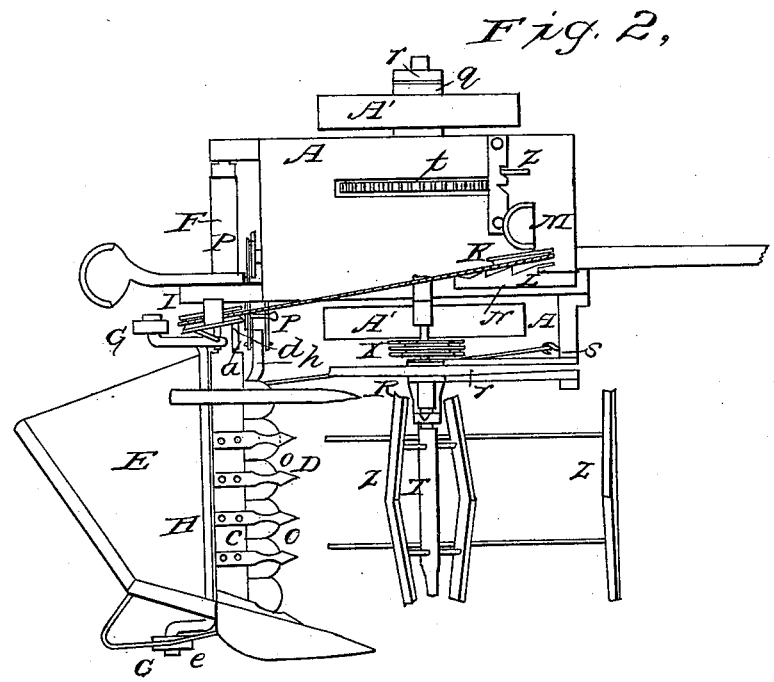
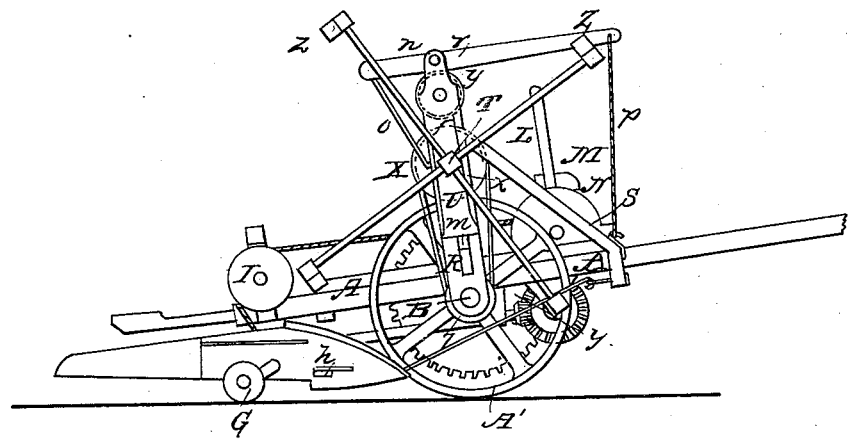
Witnesses:
Chas C Tucker
Julius Hirsch
Inventor:
T. S. Hunter
by his attorneys
Grigwas & Cohen

UNITED STATES PATENT OFFICE.

THEODRIC S. HUNTER, OF CROSS PLAINS, INDIANA.

IMPROVEMENT IN HARVESTERS.

Specification forming part of Letters Patent No. 41,071, dated January 5, 1864.

*To all whom it may concern:*

Be it known that I, THEODRIC S. HUNTER, of Cross Plains, in the county of Ripley and State of Indiana, have invented certain new and useful Improvements in Grain and Grass Harvesters; and I do hereby declare that the following is a full, clear, and exact description of the construction and operation of the same, reference being had to the accompanying drawings, in which—

Figure 1 represents a perspective view of said machine. Fig. 2 represents a top view of the same. Fig. 3 represents a side view of the machine. Figs. 4, 5, and 6 represent detached views of the cutting apparatus. Figs. 7, 8, and 9 represent detached views, hereinafter to be referred to.

To enable others skilled in the art to make and use my invention, I will proceed to describe its construction and operation.

A represents the frame of the machine. It is supported by the main axle B, on which the driving-wheels A' revolve, and which operate the cutting apparatus by means of intermediate gearing, as hereinafter described, in the operation of the machine.

C represents the finger-bar, to which the fingers D and platform E are secured. It is hinged to the main frame by means of a double-hinged joint, so as to adapt itself to the inequalities of the ground, it being pivoted at $a$ to the bar F, which is hinged at $b$ to the main frame, thus allowing said finger-bar full and free play while passing over rough ground. In this motion the cutter-bar is supported by the wheels G, which turn on the crank-pivots $c$ of the rod H, the latter being hinged to the rear side of the finger-bar. One of the cranks of the rod $c$ has an arm, $d$, at its front, to which a rope or belt is secured, which passes over the pulley I and thence over pulley K. The lever L is secured to the latter, and within reach at the driver's seat M, and by operating said lever, the finger-beam and platform may be raised or lowered by the driver to pass them over obstructions. The lever L is so shaped and secured to the pulley K that it may drop automatically into the notches 1 of the ratchet or stop wheel N, and whereby the finger-bar and platform may be retained in any desired position; or the lever L may be passed by the side of said ratchet-wheel to turn the pulley K.

My cutting apparatus is represented on an enlarged scale in Figs. 4, 5, and 6.

I make the blades or knives half-round, or in the shape of a half-circle, O, having a cutting-edge around their entire circumference, and the shape of that part of the guard-fingers against which the grain is cut is concave, as represented at 2, and the edges ground sharp, while the part in front of the cutting-edges is tapering to a point. I thus obtain a convex cutting-edge working at each stroke and each way against a concave cutter. By using these curved cutting-edges, as described, the angle in which the grain is cut is reduced to a very small dimension, as it is formed by the two intersecting curves represented in Fig. 4, and they thus cut the grain more effectually than the straight-edged cutters and tapering guard-fingers used generally.

The guard-finger D is open at its lower side, so that any grass or dirt which may get in between the cutters may work out to the rear, and as the upper side only of the guard-finger is secured to the finger beam the parts can sufficiently yield to prevent the cutters from being choked.

P represents the connecting-rod between the crank-wheel Q and the cutter-bar $h$. It is represented in a detached view in Fig. 7. Its forked ends $f$ are provided with pivot-holes 4, into which the stationary pins $s$, which extend from the two sides of the cutter-bar joint, are inserted. As it is desirable in harvesting-machines to adjust the length of the sickle-stroke, I make the holes 9 in the crank-wheel Q at various distances from the center, and am enabled to adjust the length of the connecting-rod P by means of the pivot-holes 4.

To make the connecting-rod P readily attachable to or detachable from the cutter-bar $h$, I make one of the shanks $f$ with a hinged joint, 5, and secure them together by means of a screw or bolt, $g$, which passes through both shanks $f$ and through the hinged latch 6. Thus when the connecting-rod is to be detached the screw $g$ is loosened, the arm $f$ is turned on the hinge 5, and the cutter-bar is released.

R represents the reel-stand. It is pivoted to the end of the main axle B, and is braced against the frame A by means of the brace S. The reel-stand has a slot, $k$, in its center, in which the box or bearing $m$ of the reel-shaft T rests, and which can slide therein longitudinally. A brace, U, extends from the box $m$ to the reel-shaft to support the latter in its horizontal position.

V represents a lever, which has its fulcrum at $n$ in the reel-stand. Its long arm extends forward and toward the driver's seat, and the short arm is connected by means of the rod $o$ with the journal-box $m$. Thus by operating the long arm of the lever V by means of a cord, $p$, the box $m$, and consequently the reel, is raised or lowered to the desired position; but as this raising and lowering of the reel must be effected without interrupting its motion I have so arranged the pulleys which drive the reel that the regular operation of the same shall not be disturbed. From the driving-pulley 7 on the main axle B of the machine the belt or rope passes up to the pulley X of the reel-shaft. The ropes are crossed above said pulley and pass around the pulley Y, as represented in the drawings. Thus by raising or lowering the reel-shaft and pulley X the latter always remains in a position by which the action of the cords or belts upon it is not changed.

Z represents the reel-beaters. They are made in an angular or bent shape, as represented in the drawings, for the purpose of drawing the grain from the sides toward the center. In using the straight reel-arms the outside grain frequently escapes the action of the reel-beaters and of the cutters, and is left standing and interferes considerably with the operation of the machine. By using bent reel-beaters the grain is drawn in to a certain extent from the sides, and thus is not liable to be left standing.

$q$ represents a ratchet-wheel, which is formed on the end of the wheel-hub of the driving-wheel A'. The inner face of it is represented in a perspective view at Fig. 8 and in a cross-section in Fig. 9. This ratchet, together with the driving-wheel, turns loosely on the main axle B. $r$ represents another ratchet, which is secured to the main shaft B, and held against the ratchet-wheel $q$ by means of the pin $s$. It is provided in its interior with spring-pawls $v$, against which the projections $u$ of the ratchet-wheel $q$ press when the machine moves forward, and by which the cutting apparatus is operated by means of intermediate gearing. When the machine is backed, the spring-pawls $v$ yield and slip over the projections $u$ of the ratchet $q$, and the main axle B is not operated. This ratchet arrangement is very simple and is not liable to get out of working order.

When the machine is drawn over the field and forward, the driving-wheels A' turn the ratchets $q$, ratchets $r$, shaft B, gear-wheel $t$ and its pinion, bevel-wheel $w$, pinion $y$, crank-wheel $q$, and the cutting apparatus. The gearing may be uncoupled by means of a clutch attached to lever $z$.

Having thus fully described the nature of my invention, what I claim herein as new, and desire to secure by Letters Patent, is—

In combination with the convex half-circular smooth-edged cutters O, the concave or scalloped guard-finger D, having smooth concave edges 2, against which the convex cutters work, the upper part, 3, of the guard being closed, while the lower part, 4, extends under and to the rear of the cutter, leaving an opening through which grass and other material are discharged to clear the cutters.

THEODRIC S. HUNTER.

Witnesses:
T. J. KENAN,
HENRY MATTHEY.